US010961374B2

(12) United States Patent
Dronet et al.

(10) Patent No.: US 10,961,374 B2
(45) Date of Patent: Mar. 30, 2021

(54) RUBBER COMPOSITION WITH A GOOD DISPERSION OF LARGE AMOUNTS OF REINFORCING INORGANIC FILLER

(71) Applicant: COMPAGNIE GENERALE DES ETABLISSEMENTS MICHELIN, Clermont-Ferrand (FR)

(72) Inventors: Séverin Dronet, Clermont-Ferrand (FR); Laurent Petitjean, Clermont-Ferrand (FR); Marc Couty, Clermont-Ferrand (FR); Corentin Pavageau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 79 days.

(21) Appl. No.: 16/472,671

(22) PCT Filed: Dec. 21, 2017

(86) PCT No.: PCT/FR2017/053763
§ 371 (c)(1),
(2) Date: Jun. 21, 2019

(87) PCT Pub. No.: WO2018/115761
PCT Pub. Date: Jun. 28, 2018

(65) Prior Publication Data
US 2019/0367711 A1    Dec. 5, 2019

(30) Foreign Application Priority Data
Dec. 22, 2016 (FR) ........................ 1663212

(51) Int. Cl.
C08L 15/00 (2006.01)
B60C 1/00 (2006.01)
B60C 11/00 (2006.01)

(52) U.S. Cl.
CPC ............ C08L 15/00 (2013.01); B60C 1/0016 (2013.01); B60C 11/0008 (2013.01); B60C 2011/0025 (2013.01)

(58) Field of Classification Search
CPC ... C08L 15/00; B60C 1/0016; B60C 11/0008; B60C 2011/0025
USPC ........................................................ 524/526
See application file for complete search history.

(56) References Cited

U.S. PATENT DOCUMENTS

| 3,135,716 A | 6/1964 | Uraneck et al. |
| 3,244,664 A | 4/1966 | Zelinski et al. |
| 5,409,969 A | 4/1995 | Hamada |
| 5,508,333 A | 4/1996 | Shimizu |
| 8,344,063 B2 * | 1/2013 | Marechal ................ C08C 19/25 524/571 |
| 10,689,507 B2 * | 6/2020 | Abad .................... B60C 1/0016 |
| 2010/0184912 A1 * | 7/2010 | Marechal ............. B60C 1/0016 524/571 |
| 2012/0003413 A1 * | 1/2012 | Lesage .................. B60C 1/0008 428/36.6 |
| 2016/0319116 A1 * | 11/2016 | Labrunie ................ C08L 23/20 |
| 2018/0186978 A1 * | 7/2018 | Abad ....................... C08K 3/06 |

FOREIGN PATENT DOCUMENTS

| CA | 2933303 A1 * | 6/2015 | ........... C08L 53/025 |
| EP | 0626278 B1 | 1/1999 | |
| EP | 0590490 B1 | 7/1999 | |
| EP | 0778311 B1 | 1/2000 | |
| EP | 0877047 B1 | 10/2002 | |
| EP | 2951178 B1 | 10/2002 | |
| FR | 2939076 A1 | 6/2010 | |
| FR | 3014443 A1 | 6/2015 | |
| JP | S62227908 A | 10/1987 | |
| JP | S63215701 A | 9/1988 | |
| WO | 9637547 A2 | 11/1996 | |
| WO | 9928380 A1 | 6/1999 | |
| WO | 0210269 A2 | 2/2002 | |
| WO | 03016837 A1 | 2/2003 | |
| WO | 2006050486 A1 | 5/2006 | |
| WO | 2006125534 A1 | 11/2006 | |
| WO | 2009077837 A1 | 6/2009 | |
| WO | 2011042507 A1 | 4/2011 | |
| WO | 2015091929 A1 | 6/2015 | |
| WO | WO-2015091929 A1 * | 6/2015 | ................ C08L 7/00 |
| WO | 2016001372 A1 | 1/2016 | |

OTHER PUBLICATIONS

International Search Report for corresponding International Application No. PCT/FR2017/053763 dated Mar. 22, 2018.
Written Opinion for corresponding International Application No. PCT/FR2017/053763.
French Search Report regarding related French Application No. FR 1663212 dated Sep. 4, 2017.

* cited by examiner

*Primary Examiner* — Michael Bernshteyn
(74) *Attorney, Agent, or Firm* — Dickinson Wright PLLC

(57) ABSTRACT

A rubber composition based on at least an elastomer matrix is provided. The elastomer matrix comprises a first diene elastomer having a number-average molecular weight, Mn, of greater than or equal to 100 000 g/mol; a functionalized second diene elastomer bearing at the chain end a function capable of reacting with the surface of silica, said functionalized diene elastomer having a number-average molecular weight, Mn, of less than or equal to 80 000 g/mol: and a reinforcing inorganic filler, in an amount ranging from 55 phr to 200 phr. The elastomeric matrix allows good dispersion of the reinforcing inorganic filler. A finished or semi-finished article comprising such a composition, tire tread comprising such a composition, and a tire or semi-finished product comprising such a composition is also provided.

19 Claims, No Drawings

RUBBER COMPOSITION WITH A GOOD DISPERSION OF LARGE AMOUNTS OF REINFORCING INORGANIC FILLER

This application is a 371 national phase entry of PCT/FR2017/053763 filed on 21 Dec. 2017, which claims benefit of French Patent Application No. 1663212, filed 22 Dec. 2016, the entire contents of which are incorporated herein by reference for all purposes.

BACKGROUND

1. Technical Field

The present invention relates to a rubber composition that can be used in particular for the manufacture of tire material, allowing good dispersion of high amounts of reinforcing inorganic filler, comprising a blend of a low-molecular-weight diene elastomer functionalized at the chain end with a function capable of reacting with the surface of silica, in particular an SiOR function, R denoting a hydrogen atom or a hydrocarbon-based group, or a polysiloxane block having a silanol end, and of a higher-molecular-weight diene elastomer.

2. Related Art

It is known that in order to obtain the optimum reinforcing properties and hysteresis properties imparted by a filler to a tire tread, and thus to obtain high wear resistance and low rolling resistance, it is generally advisable for this filler to be present in the elastomer matrix in a final form that is both as finely divided as possible and as uniformly distributed as possible. However, such conditions can be achieved only if this filler has a very good ability, on the one hand, to be incorporated into the matrix during the mixing with the elastomer and to deagglomerate, and, on the other hand, to disperse uniformly in this matrix.

Since fuel savings and the need to protect the environment have become a priority, it has proved necessary to produce tires having a reduced rolling resistance without adversely affecting their wear resistance.

This has been made possible in particular by virtue of the use, in the treads of these tires, of novel rubber compositions reinforced at least partially with inorganic fillers, in particular specific silicas of the highly dispersible type, which are capable of rivalling, from the reinforcing viewpoint, a conventional tire-grade carbon black, while offering these compositions a lower hysteresis, which is synonymous with a lower rolling resistance for the tires comprising them, and also improved grip on wet, snowy or icy ground. However, for reciprocal affinity reasons, these inorganic filler particles have an annoying tendency to clump together in the elastomeric matrix. These interactions have the harmful effect of limiting the dispersion of the filler and therefore the reinforcing properties to a level substantially below that which it would be theoretically possible to achieve if all the bonds (inorganic filler/elastomer bonds) capable of being created during the mixing operation were actually obtained.

In order to achieve such an objective, numerous solutions have been proposed, consisting in particular in modifying the nature of the diene polymers and copolymers at the end of polymerization by means of coupling or star-branching or functionalizing agents. The vast majority of these solutions essentially concentrated on the use of modified polymers with carbon black as reinforcing filler with the aim of obtaining a good interaction between the modified polymer and the carbon black. By way of illustrative examples of this prior art, mention may be made of U.S. Pat. No. 3,135,716 which describes the reaction of living diene polymers at the chain end with a polyfunctional organic coupling agent in order to obtain polymers with improved properties, and U.S. Pat. No. 3,244,664 which describes tetraalkoxysilanes as an agent for coupling or star-branching diene polymers.

In the context of mixtures containing a reinforcing inorganic filler, it has been proposed to use diene copolymers functionalized with silanol groups.

Mention may be made of patents FR 2 951 178 B1 and EP 778 311 B1 which describe the use of diene polymers functionalized with a silanol group at the chain end. In patent FR 2 951 178 B1, the functional polymers are described as being combined with star-branched polymers using tin-based compounds. More recently, patent application WO 2009/077837 A1 describes elastomers functionalized with a silanol group at one chain end and with an amino group at the other chain end, or application WO 2016/001372 describes elastomers functionalized with a silanol group at one chain end, having a polydispersity index before functionalization of less than or equal to 1.6, combined with a star-branched diene elastomer.

However, improvements in the dispersion of the silica and reductions in rigidity despite a large amount of silica are still being sought.

SUMMARY

The invention relates to a rubber composition based on at least:
an elastomer matrix comprising
  i. a first diene elastomer having a number-average molecular weight, Mn, of greater than or equal to 100 000 g/mol,
  ii. a functionalized second diene elastomer bearing at the chain end a function capable of reacting with the surface of silica, said functionalized diene elastomer having a number-average molecular weight, Mn, of less than or equal to 80 000 g/mol,
a reinforcing inorganic filler, in an amount ranging from 55 phr to 200 phr.

In addition, the amount of reinforcing inorganic filler advantageously ranges from 20% to 40% by volume, relative to the volume of the rubber composition.

The proportion of said functionalized second diene elastomer advantageously ranges from 50% to 95% by weight, relative to the total weight of said first diene elastomer and of said functionalized second diene elastomer. In particular, the weight fraction of said first diene elastomer in the elastomeric matrix is less than or equal to 50% by weight, more particularly it ranges from 5% to 50% by weight. In particular, the weight fraction of said functionalized second diene elastomer in the elastomeric matrix is greater than or equal to 50% by weight, more particularly it ranges from 50% to 95% by weight.

Advantageously, said first diene elastomer has a number-average molecular weight, Mn, ranging from 100 000 g/mol to 600 000 g/mol. Said first diene elastomer is advantageously selected from the group consisting of polybutadienes, natural rubber, synthetic polyisoprenes, butadiene copolymers, isoprene copolymers and blends of these elastomers, in particular a butadiene/styrene copolymer.

Advantageously, said functionalized second diene elastomer has a number-average molecular weight, Mn, ranging from 20 000 g/mol to 80 000 g/mol. Said functionalized second diene elastomer is advantageously selected from the group consisting of polybutadienes, natural rubber, synthetic polyisoprenes, butadiene copolymers, isoprene copolymers and blends of these elastomers, in particular a butadiene/styrene copolymer.

In said functionalized second diene elastomer, the function capable of reacting with the surface of silica is advantageously an SiOR function, R denoting a hydrogen atom or a hydrocarbon-based group, or a polysiloxane block having a silanol end.

The polysiloxane block having a silanol end advantageously corresponds to the formula:

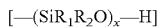
[—(SiR$_1$R$_2$O)$_x$—H]

wherein:

R$_1$ and R$_2$, which may be identical or different, represent an alkyl, cycloalkyl, aryl, alkaryl or vinyl group having from 1 to 10 carbon atoms, in particular R$_1$ and R$_2$, which may be identical or different, represent an alkyl group having from 1 to 10 carbon atoms, preferably the methyl radical;

x is an integer ranging from 1 to 1500.

In the rubber composition, the content of reinforcing inorganic filler advantageously ranges from 55 phr to 170 phr. In addition, the amount of reinforcing inorganic filler more advantageously ranges from 20% to 30% by volume, relative to the volume of the rubber composition.

The reinforcing inorganic filler is advantageously silica or a silica-covered carbon black, preferably silica.

The reinforcing inorganic filler advantageously constitutes all of the reinforcing filler.

The silica is advantageously a silica with a BET specific surface area of between 30 and 400 m$^2$/g, advantageously between 40 and 300 m$^2$/g, advantageously between 60 and 250 m$^2$/g.

The compositions according to the invention make it possible:
- to disperse the silica more finely than in compositions comprising only functional diene elastomers of high molar masses, and to depart from the usual compromise of reinforcement of a blend using silica.
- to incorporate large amounts of silica into the composition.
- to reduce the rigidity of the material at equal filler content compared with compositions comprising only functional diene elastomers of high molar masses.
- to improve the elongation at break compared with compositions comprising only functional diene elastomers of high molar masses.

The invention also relates to a finished or semi-finished article comprising a rubber composition according to the invention.

The invention also relates to a tire tread comprising a rubber composition according to the invention.

The invention also relates to a tire or semi-finished product comprising a rubber composition according to the invention.

I—DETAILED DESCRIPTION OF EXAMPLE EMBODIMENTS

In the present description, unless expressly indicated otherwise, all the percentages (%) shown are % by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

The compounds mentioned in the description and participating in the preparation of rubber compositions or polymers can be of fossil or biobased origin. In the latter case, they may partially or completely result from biomass or be obtained from renewable starting materials resulting from biomass. Polymers, plasticizers, fillers, etc., are concerned in particular.

I-1. Diene Elastomer:

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, the term "diene elastomer" is intended to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter contain from 20% to 99% by weight of diene units and from 1% to 80% by weight of vinylaromatic units.

The following are especially suitable as conjugated dienes which can be used in the process in accordance with the invention: 1,3-butadiene, 2-methyl-1,3-butadiene, 2,3-di(C$_1$ to C$_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene and 2,4-hexadiene, etc.

The following are especially suitable as vinylaromatic compounds: styrene, ortho-, meta- or para-methylstyrene, the "vinyltoluene" commercial mixture, para-(tert-butyl) styrene, methoxystyrenes, vinylmesitylene, divinylbenzene and vinylnaphthalene, etc.

The diene elastomer is preferentially selected from the group of highly unsaturated diene elastomers consisting of polybutadienes (BRs), natural rubber, synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The diene elastomer can have any microstructure which depends on the polymerization conditions used. The elastomer can be a block, statistical, sequential or microsequential elastomer, etc., and can be prepared in dispersion or in solution.

In the composition according to the invention, at least two elastomers are used.

The first elastomer has a number-average molecular weight, Mn, of greater than or equal to 100 000 g/mol, advantageously ranging from 100 000 g/mol to 600 000 g/mol, more advantageously ranging from 140 000 g/mol to 500 000 g/mol.

The polydispersity index is advantageously less than 4.

Said first diene elastomer is advantageously selected from the group consisting of polybutadienes, natural rubber, synthetic polyisoprenes, butadiene copolymers, isoprene copolymers and blends of these elastomers, in particular a butadiene/styrene copolymer.

The second elastomer has a number-average molecular weight, Mn, of less than or equal to 80 000 g/mol, advantageously ranging from 20 000 g/mol to 80 000 g/mol.

The polydispersity index is advantageously less than 2.

It is understood that the first elastomer may consist of a mixture of elastomers which differ from one another in their macrostructure or their microstructure.

Said second diene elastomer is advantageously selected from the group consisting of polybutadienes, natural rubber, synthetic polyisoprenes, butadiene copolymers, isoprene copolymers and blends of these elastomers, in particular a butadiene/styrene copolymer.

This second diene elastomer is functionalized, bearing at the chain end a function capable of reacting with the surface of silica, in particular an SiOR function, R denoting a hydrogen atom or a hydrocarbon-based group, or a polysiloxane block having a silanol end.

The second diene elastomer may be a linear or star-branched, or even branched, polymer.

According to one preferential embodiment of the invention, the second diene elastomer is predominantly in a linear form, that is to say that if it comprises star-branched or branched chains, these represent a minority weight fraction in this elastomer.

According to one particularly preferential embodiment, the second diene elastomer bears at least one function, referred to as a "silanol" function, of formula SiOH (R is then a hydrogen atom).

Diene elastomers corresponding to such a definition are well known; they have for example been described in documents EP-0 778 311 B1, WO-2011/042507 A1, WO-2006/050486 A1, WO-2009/077837 A1 or EP-0 877 047 B1. The silanol function SiOH is located at the end of the diene elastomer chain, in particular in the form of a dimethylsilanol group -Me$_2$SiOH.

According to one particular embodiment of the invention, the silanol function can be bonded to a polysiloxane, such as for example described in patent EP-0 778 311 B1.

The polysiloxane block having a silanol end advantageously corresponds to general formula (I) below:

[—(SiR$_1$R$_2$O)$_x$—H]     (I)

wherein:

R$_1$ and R$_2$, which may be identical or different, represent an alkyl, cycloalkyl, aryl, alkaryl or vinyl group having from 1 to 10 carbon atoms, x is an integer ranging from 1 to 1500.

Advantageously, R$_1$ and R$_2$, which may be identical or different, represent an alkyl group having from 1 to 10 carbon atoms. Preferably, R$_1$ and R$_2$ each represent a methyl radical.

According to another embodiment of the invention, the second diene elastomer bears at least one function of formula SiOR in which R is a hydrocarbon-based radical.

Diene elastomers corresponding to such a definition are well known; they have for example been described in documents JP-63-215701, JP-62-227908, U.S. Pat. No. 5,409,969 or WO-2006/050486.

In one embodiment, the functionalized diene elastomer bearing a function capable of reacting with the surface of silica is monofunctional. In other words, the diene elastomer is functionalized at just one chain end. The other chain end is free and bears no function.

In another embodiment, the second diene elastomer, bearing at least one function capable of reacting with the surface of silica, also bears at least one other function which is different from the SiOR function or the polysiloxane block. This other function is generally provided by the polymerization initiator. According to one preferential embodiment, this other function borne by the second diene elastomer is an amine function.

More particularly, according to one embodiment, the amine function may be present on a chain end that does not bear the SiOR function or the polysiloxane block. Such a configuration may be produced for example by the use of an initiator bearing an amine function, in particular by the use of an initiator that is a lithium amide, such as the lithium amide of pyrrolidine or the lithium amide of hexamethyleneimine, or an organolithium compound bearing an amine function such as dimethylaminopropyllithium and 3-pyrrolidinopropyllithium. Such initiators have been described for example in patents EP-0 590 490 B1 and EP-0 626 278 B1. Such elastomers bearing an SiOR function and an amine function at their different chain ends have for example been described in patents EP-0 778 311 B1, WO 2009/077837 A1 and U.S. Pat. No. 5,508,333.

It is understood that the second elastomer may consist of a mixture of elastomers which differ from one another in the chemical nature of the end function, in their microstructure or else in their macrostructure.

The proportion of said functionalized second diene elastomer advantageously ranges from 50% to 95% by weight, relative to the total weight of said first diene elastomer and of said functionalized second diene elastomer.

In particular, the weight fraction of said first diene elastomer in the elastomeric matrix is less than or equal to 50% by weight, more particularly it ranges from 5% to 50% by weight, advantageously less than or equal to 30% by weight, in particular from 10% to 30% by weight.

In particular, the weight fraction of said functionalized second diene elastomer in the elastomeric matrix is greater than or equal to 50% by weight, more particularly it ranges from 50% to 95% by weight, advantageously greater than or equal to 70% by weight, in particular from 70% to 90% by weight.

Advantageously, the elastomeric matrix comprises more than 50%, preferentially more than 70%, by weight of said functionalized second diene elastomer, the remainder to 100% consisting of said first diene elastomer.

I-2. Reinforcing Filler

The term "inorganic filler" should be understood here as meaning, in a known way, any inorganic or mineral filler, whatever its colour and its origin (natural or synthetic), also referred to as "white filler", "clear filler" or also "non-black filler", in contrast to carbon black, this inorganic filler being capable of reinforcing by itself alone, without means other than an intermediate coupling agent, a rubber composition intended for the manufacture of a tread for tires, in other words capable of replacing, in its reinforcing role, a conventional tire-grade carbon black for a tread. Such a filler is generally characterized by the presence of functional groups, especially hydroxyl (—OH), at its surface, requiring, in order to be used as reinforcing filler, the use of a coupling agent or system intended to provide a stable chemical bond between the diene elastomer and said filler.

Such an inorganic filler may thus be used with a coupling agent in order to enable the reinforcement of the rubber composition in which it is included. It may also be used with a covering agent (which does not provide a bond between the filler and the elastomeric matrix), optionally in addition to a coupling agent.

The physical state in which the inorganic filler is provided is not important, whether it is in the form of a powder, micropearls, granules, beads or any other appropriate densified form. Of course, the term "inorganic filler" is also understood to mean mixtures of various inorganic fillers, in particular of highly dispersible siliceous and/or aluminous fillers, as described below. Inorganic fillers of the siliceous type, in particular silica ($SiO_2$), or of the aluminous type, in particular alumina ($Al_2O_3$), are suitable in particular as inorganic fillers. The silica used may be any silica known to those skilled in the art, especially any precipitated or fumed silica with a BET surface area and a CTAB specific surface area that are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1200MP, 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

When the compositions of the invention are intended for tire treads having a low rolling resistance, the inorganic filler used, in particular if it is silica, preferably has a BET surface area of between 30 and 400 $m^2/g$, advantageously between 40 and 300 $m^2/g$, advantageously between 60 and 250 $m^2/g$.

Those skilled in the art will understand that, as filler equivalent to the reinforcing inorganic filler described in the present section, a reinforcing filler of another nature, in particular organic nature, might be used provided that this reinforcing filler is covered with an inorganic layer, such as silica, or else comprises functional sites, in particular hydroxyl sites, at its surface requiring the use of a coupling agent in order to form the bond between the filler and the elastomer. By way of example, mention may be made of patent documents WO 96/37547, WO 99/28380.

The content of reinforcing inorganic filler will range from 55 phr to 200 phr, advantageously from 55 phr to 170 phr. In addition, the amount of reinforcing inorganic filler advantageously ranges from 20% to 40% by volume, relative to the volume of the rubber composition, more advantageously from 20% to 30% by volume.

The compositions of the invention can thus be described as compositions with a high content of reinforcing inorganic filler, in particular of silica.

Advantageously, the reinforcing inorganic filler constitutes all of the reinforcing filler.

According to one variant of the invention, when carbon black may also be present, it may be used at a content of less than 20 phr, more advantageously of less than 10 phr, for example between 0.5 and 20 phr, especially from 1 to 10 phr.

In order to couple the reinforcing inorganic filler to the diene elastomer, use may be made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes. Use is in particular made of polysulfide silanes, referred to as "symmetrical" or "asymmetrical", silanes bearing at least one thiol (—SH) function (referred to as mercaptosilanes) and/or at least one blocked thiol function. Of course, use might also be made of mixtures of the coupling agents described above, as described especially in application WO 2006/125534.

However, by virtue of the presence of the functionalized second diene elastomer, the use of a coupling agent is only optional.

The content of coupling agent is advantageously less than 20 phr, it being understood that it is generally desirable to use as little as possible of it. Typically, the content of coupling agent represents from 0.5% to 15% by weight, relative to the amount of silica. The content thereof is preferentially between 0.5 and 15 phr, more preferentially between 3 and 12 phr. This content is easily adjusted by those skilled in the art depending on the content of silica used in the composition.

Processing aids capable, in a known way, by virtue of an improvement in the dispersion of the inorganic filler in the rubber matrix and of a lowering in the viscosity of the compositions, of improving their ease of processing in the raw state will generally be considered as covering agent, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid. Guanidine derivatives, in particular diphenylguanidine, will also be considered as covering agent.

I-3. Various Additives

These rubber compositions in accordance with the invention may also comprise all or some of the standard additives customarily used in elastomer compositions intended for the manufacture of tires, in particular treads, such as for example plasticizers or extender oils, whether the latter are of aromatic or non-aromatic type, plasticizing resins, pigments, protection agents such as antiozone waxes, chemical antiozonants, anti-fatigue agents, reinforcing resins, methylene acceptors (for example, phenol-novolac resin) or methylene donors (for example, HMT or H3M) as described, for example, in application WO 02/10269, a crosslinking system based on either sulfur or on sulfur donors, and/or on peroxide and/or on bismaleimides, vulcanization accelerators.

I-4. Preparation of the Rubber Compositions

The rubber compositions of the invention are manufactured in appropriate mixers using two successive preparation phases according to a general procedure well known to those skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 20° C. and 100° C., during which finishing phase the crosslinking or vulcanization system is incorporated.

According to one embodiment of the invention, all the base constituents of the compositions of the invention, with the exception of the vulcanization system, are intimately incorporated, by kneading, during the first "non-productive" phase, that is to say that at least these various base constituents are introduced into the mixer and are thermomechanically kneaded, in several steps, until the maximum temperature of between 130° C. and 200° C., preferably of between 145° C. and 185° C., is reached.

By way of example, the first (non-productive) phase is carried out in at least three thermomechanical steps during which all the necessary constituents, the optional supplementary covering agents or processing aids and various other additives, with the exception of the vulcanization system, are introduced into an appropriate mixer, such as an ordinary internal mixer. The total duration of the kneading, in this non-productive phase, is preferably between 1 and 15 min.

After cooling the mixture thus obtained during the first non-productive phase, the vulcanization system is then incorporated at low temperature, generally in an external mixer, such as an open mill; the whole is then mixed (productive phase) for a few minutes, for example between 2 and 15 min.

The crosslinking system is preferentially a vulcanization system, that is to say a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives, are added to this base vulcanization system, being incorporated during the non-productive first phase and/or during the productive phase, as described subsequently.

The sulfur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulfur, in particular accelerators of the thiazole type and also derivatives thereof, and accelerators of thiuram and zinc dithiocarbamate types. These accelerators are, for example, selected from the group consisting of 2-mercaptobenzothiazyl disulfide (abbreviated to "MBTS"), tetrabenzylthiuram disulfide ("TBZTD"), N-cyclohexyl-2-benzothiazylsulfenamide ("CBS"), N,N-dicyclohexyl-2-benzothiazylsulfenamide ("DCBS"), N-(tert-butyl)-2-benzothiazylsulfenamide ("TBBS"), N-(tert-butyl)-2-benzothiazylsulfenimide ("TBSI"), zinc dibenzyldithiocarbamate ("ZBEC") and the mixtures of these compounds.

The final composition thus obtained is subsequently calendered, for example in the form of a sheet or of a slab, especially for laboratory characterization, or else extruded in the form of a rubber profiled element which can be used, for example, as a tire tread for a passenger vehicle, heavy duty vehicle, etc.

The invention also relates to a finished or semi-finished article comprising a rubber composition according to the invention.

The invention also relates to a tire tread comprising a rubber composition according to the invention.

The invention also relates to a tire or semi-finished product comprising a rubber composition according to the invention.

II. EXEMPLARY EMBODIMENTS OF THE INVENTION

Measurements and Tests Used
Dynamic Properties:
The dynamic properties G', G" and tan(δ) are measured on a viscosity analyser (Metravib VA4000) according to Standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, under standard temperature conditions (23° C.) according to Standard ASTM D 1349-99, is recorded.

A strain amplitude sweep is carried out from 0.1% to 100% peak-to-peak (outward cycle) and then from 100% to 0.1% peak-to-peak (return cycle). The results made use of are the dynamic shear storage modulus (G'), the loss modulus (G") and the loss factor tan(δ).

High Strains:
The high-strain tensile tests make it possible to determine the elasticity stresses and the properties at break of the materials. Unless otherwise indicated, they are carried out in accordance with French Standard NF T 46-002 of September 1988. The tensile measurements for determining stresses and elongations are carried out at a temperature of 23° C.±2° C. under standard hygrometry conditions (50±5% relative humidity). The "nominal" secant moduli (or apparent stresses, in MPa) at 10% elongation ("MA10"), at 100% elongation ("MA100") and at 300% elongation ("MA300") are calculated from the measurements of stresses and elongation.

Polymer Characterization:
a. Molar Mass of the Elastomers
It is determined by triple-detection size exclusion chromatography (SEC3D)
i) Principle of the Measurement:
Size exclusion chromatography or SEC makes it possible to separate macromolecules in solution according to their size through columns filled with a porous gel. The macromolecules are separated according to their hydrodynamic volume, the bulkiest being eluted first.

Combined with 3 detectors (3D), a refractometer, a viscometer and a 90° light scattering detector, SEC makes it possible to learn the absolute molar mass distribution of a polymer. The various number-average (Mn) and weight-average (Mw) absolute molar masses and the polydispersity index (PI=Mw/Mn) can also be calculated.

ii) Preparation of the Polymer:
There is no specific treatment of the polymer sample before analysis. Said sample is simply dissolved, in (tetrahydrofuran+1 vol % of diisopropylamine+1 vol % of triethylamine), at a concentration of approximately 1 g/l. The solution is then filtered through a filter with a porosity of 0.45 μm before injection.

III) 3D-Sec Analysis:
The apparatus used is a "Waters Alliance" chromatograph. The elution solvent is (tetrahydrofuran+1 vol % of diisopropylamine+1 vol % of triethylamine), the flow rate is 0.5 ml/min, and the system temperature is 35° C. A set of four Polymer Laboratories columns in series, having the trade names: two "Mixed A LS" and two "Mixed B LS", is used.

The volume of the solution of the polymer sample injected is 100 μl. The detection system used is the "TDA 302 from Viscotek", it is composed of a differential refractometer, a differential viscometer and a 90° light scattering detector. For these 3 detectors, the wavelength is 670 nm. For the calculation of the average molar masses, the refractive index increment value dn/dC of the polymer solution is integrated, said value being defined beforehand in "tetrahydrofuran+1 vol % of diisopropylamine+1 vol % of triethylamine", at 35° C. and 670 nm. The software for exploiting the data is the "Omnisec system from Viscotek".

b. Microstructure of the Elastomers by NMR

The contents of the different monomer units and their microstructures within the copolymer are determined by an NMR analysis. The spectra are acquired on 10 a Bruker 500 MHz spectrometer equipped with a 5 mm BBI Z-grad "broad band" probe. The quantitative $^1$H NMR experiment uses a simple 30° pulse sequence and a repetition time of 5 seconds between each acquisition. The samples are dissolved in $CDCl_3$.

The various functional elastomers are synthesized according to the process described in application EP-0 778 311.

Polymer I1, according to the invention: SBR silanol-functional at the chain end according to the invention, Mn=35 000 g/mol

TABLE 1

| | Mn (g/mol) | Mw (g/mol) | PI | $(CH_3)_2Si$ function content (meq/kg) | weight % PB 1, 2 | weight % Styrene |
|---|---|---|---|---|---|---|
| I1 | 35 000 | 71 700 | 2.05 | 30.4 | 18.3 | 27.7 |

Polymer I2, according to the invention: SBR non-functionalized, Mn=241 600 g/mol

TABLE 2

| | Mn (g/mol) | Mw (g/mol) | PI | $(CH_3)_2Si$ function content (meq/kg) | weight % PB 1, 2 | weight % Styrene |
|---|---|---|---|---|---|---|
| I2 | 241 600 | 456 600 | 1.89 | 0 | 18.7 | 26.8 |

Polymer X1 (comparative): SBR silanol-functional at the chain end according to the invention, Mn=150 000 g/mol

TABLE 3

| | Mn (g/mol) | Mw (g/mol) | PI | $(CH_3)_2Si$ function content (meq/kg) | weight % PB 1, 2 | weight % Styrene |
|---|---|---|---|---|---|---|
| X1 | 180 000 | 324 000 | 1.8 | 6 | 17.8 | 26.0 |

Example 1

The compositions reported in Table 1 below are compared. The compositions C1, C2 and C3 are in accordance with the invention. The compositions T1, T2 and T3 are comparative compositions not in accordance with the invention. It should be noted that the compositions T2 and T3, comprising respectively 133 and 178 phr of silica (i.e. 35% and 40% by volume), could not be produced: the mixture has no cohesion, it is a powder that is unusable at the outlet of the internal mixer.

The formulations are expressed in percentage by weight per 100 parts by weight of elastomer (phr).

TABLE 4

| | T1 | T2 | T3 | C1 | C2 | C3 |
|---|---|---|---|---|---|---|
| X1 | 100 | 100 | 100 | 0 | 0 | 0 |
| I1 | 0 | 0 | 0 | 80 | 80 | 80 |
| I2 | 0 | 0 | 0 | 20 | 20 | 20 |

TABLE 4-continued

| | T1 | T2 | T3 | C1 | C2 | C3 |
|---|---|---|---|---|---|---|
| Silica (1) | 103 | 133 | 178 | 103 | 133 | 178 |
| DPG (2) | 1.6 | 2.09 | 2.63 | 1.6 | 2.09 | 2.63 |
| Covering agent (3) | 8.2 | 10.6 | 13.5 | 8.2 | 10.6 | 13.5 |
| Sulfur | 1 | 1 | 1 | 1 | 1 | 1 |
| Accelerator (4) | 1.5 | 1.5 | 1.5 | 1.5 | 1.5 | 1.5 |

(1) Precipitated silica 160MP (Zeosil 1165MP), manufactured by Solvay, type "HDS" with a BET specific surface area measured at 160 m$^2$/g;
(2) DPG = diphenylguanidine ("Perkacit" DPG from the company Flexsys);
(3) Octyltriethoxysilane ("Octeo" silane from the company Degussa);
(4) N-Cyclohexyl-2-benzothiazolesulfenamide ("Santocure CBS" from the company Flexsys).

Each of the compositions is produced, in a first step, by thermomechanical working and then, in a second finishing step, by mechanical working.

The mixing procedure for the compositions C1/T1 is described in detail:

Three-fifths of the elastomeric matrix, half of the silica and half of the DPG are introduced into a laboratory internal mixer of "Banbury" type which has a capacity of 402 cm$^3$, which is 70% filled and which has an initial temperature of 110° C.

The elastomeric matrix consists of the elastomer X1 or of the blend of elastomers 11 and 12.

The thermomechanical working is carried out by means of blades of "Banbury" type.

After one minute, the fourth fifth of the elastomeric matrix, one quarter of the silica and one quarter of the DPG are introduced. The blade speed is increased so as to reach 140° C. at 2 min.

At 2 minutes, the final fifth of the elastomeric matrix, the final quarter of the silica and the final quarter of the DPG are introduced, still with thermomechanical working. The blade speed is reduced so as to reach 150° C. at 3 min.

At 3 minutes, the pestle is raised for 5 seconds and the blade speed is reduced so as to maintain a plateau at 150° C.

At 4 minutes, the covering or coupling agent is introduced and the blade speed is increased to reach 160° C. at 5 min.

The thermomechanical working is carried out for a further one minute, by adjusting the blade speed so as to maintain a maximum dropping temperature of approximately 165° C.

For the compositions C2/T2, the elastomeric matrix, the silica and the DPG are introduced in four additions.

For the composition C3/T3, the elastomeric matrix, the silica and the DPG are introduced in five additions.

The mixture thus obtained (except for the compositions T2 or T3, for which no coherent mixture is obtained) is recovered and cooled and then, in an external mixer (homofinisher), the sulfur is added at 30° C., the combined mixture being further mixed for a time of 3 to 4 minutes (second step of mechanical working).

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads.

Crosslinking is carried out at 150° C. for 40 min.

Properties of the Mixtures at Strain:

TABLE 5

| | T1 | C1 | C2 | C3 |
|---|---|---|---|---|
| G' 10% Return | 5.74 | 5.23 | 5.52 | 8.55 |
| Tan(δ) −10% Return | 0.27 | 0.29 | 0.34 | 0.38 |

The mixture C1 exhibits a decrease in rigidity (G' 10% return) of about 10%, whereas the dissipation (tan(δ) 10% return) increases only by 7% compared with a mixture T1.

Similar results are obtained for the compositions C2 and C3.

High Strains:

TABLE 6

|  | T1 | C1 | C2 | C3 |
|---|---|---|---|---|
| Average strain at break (%)* | 532 | 722 | 605 | 463 |
| MA10 | 14.0 | 14.6 | 18.8 | 23.1 |
| MA100 | 3.2 | 2.4 | 3.1 | 4.2 |
| MA300 | 4.2 | 2.1 | 2.8 | 3.7 |

*average strain at break calculated on 3 test specimens

The high-strain tensile tests make it possible to determine the elasticity stresses and the properties at break of the materials. These values are representative of the stiffness: the higher the value of the moduli, the greater the stiffness.

The mixture C1 is less rigid at 23° C. and has an elongation at break that is approximately 200% higher compared with the mixture T1.

Example 2: Dispersion of the Silica

The raw mixture of the composition according to the invention, 01, having the composition described in Example 1, is dissolved in a correct solvent for the elastomer matrix, for example toluene or tetrahydrofuran, by stirring for 24 h at a concentration of 1 wt %. This solution is then deposited on an electron microscopy grid covered with formvar on one side and carbon on the other. The observations are carried out on a CM200 TEM in BF TEM mode at various magnifications with 10 images taken at 58 kx for image analysis. A representative image is reproduced in FIG. 1.

Example 3: Effect of the Functional Elastomer Content

The compositions reported in Table 2 below are compared. The compositions C4, C5 and C6 are in accordance with the invention. The weight ratio between the first and second elastomers according to the invention was varied. The composition T4 is a comparative composition not in accordance with the invention.

The formulations are expressed in percentage by weight per 100 parts by weight of elastomer (phr).

TABLE 7

|  | T4 | C4 | C5 | C6 |
|---|---|---|---|---|
| X1 | 100 | 0 | 0 | 0 |
| I1 | 0 | 70 | 80 | 90 |
| I2 | 0 | 30 | 20 | 10 |
| Silica (1) | 111 | 111 | 111 | 111 |
| DPG (2) | 1.96 | 1.96 | 1.96 | 1.96 |
| Covering agent (3) | 8.2 | 8.2 | 10.6 | 13.5 |
| 6PPD (4) | 2 | 2 | 2 | 2 |
| ZnO | 3 | 3 | 3 | 3 |
| Stearic Acid | 2 | 2 | 2 | 2 |
| Sulfur | 1 | 1 | 1 | 1 |
| Accelerator (5) | 1.5 | 1.5 | 1.5 | 1.5 |

(1) Precipitated silica 160 MP (Zeosil 1165 MP), manufactured by Solvay, type "HDS" with a BET specific surface area measured at 160 m²/g;
(2) DPG = diphenylguanidine ("Perkacit" DPG from the company Flexsys);
(3) Octyltriethoxysilane ("Octeo" silane from the company Degussa);
(4) 6-PPD: N-(1,3-dimethylbutyl)-N-phenylparaphenylenediamine
(5) N-Cyclohexyl-2-benzothiazolesulfenamide ("Santocure CBS" from the company Flexsys).

Each of the compositions is produced, in a first step, by thermomechanical working and then, in a second finishing step, by mechanical working. The same mixing procedure as the compositions C1/T1 described above is used.

Properties of the Mixtures at Strain:

TABLE 8

|  | T4 | C4 | C5 | C6 |
|---|---|---|---|---|
| G' 10% Return | 4.63 | 3.93 | 3.53 | 3.26 |
| Tan(δ) −10% Return | 0.32 | 0.36 | 0.33 | 0.32 |

The mixture C6 exhibits a decrease in rigidity (G' 10% return) of about 30%, whereas the dissipation (Tan(δ) 10% return) does not increase compared with a mixture T4.

Similar results are obtained for the compositions C4 and C5.

High Strains:

TABLE 9

|  | T4 | C4 | C5 | C6 |
|---|---|---|---|---|
| Average strain at break (%) | 413 | 405 | 390 | 368 |
| MA10 | 10.75 | 9.38 | 7.73 | 7.60 |
| MA100 | 2.74 | 2.39 | 2.24 | 2.14 |
| MA300 | 3.88 | 4.71 | 4.59 | 4.57 |

The high-strain tensile tests make it possible to determine the elasticity stresses and the properties at break of the materials. These values are representative of the stiffness: the higher the value of the moduli, the greater the stiffness.

The mixtures C4, C5 and C6 are less rigid (MA10 and MA100) at 23° C. and exhibit a slightly lower elongation at break compared with the mixture T3.

The invention claimed is:

1. A rubber composition based on at least:
an elastomer matrix comprising:
a first diene elastomer having a number-average molecular weight, Mn, of greater than or equal to 100 000 g/mol;
a functionalized second diene elastomer bearing at the chain end a function capable of reacting with the surface of silica, said functionalized diene elastomer having a number-average molecular weight, Mn, ranging from 20,000 g/mol to 80 000 g/mol; and
a reinforcing inorganic filler, in an amount ranging from 55 phr to 200 phr.

2. The rubber composition according to claim 1, in which the amount of reinforcing inorganic filler ranges from 20% to 40% by volume, relative to the volume of the rubber composition.

3. The rubber composition according to claim 1, in which the weight fraction of said first diene elastomer in the elastomeric matrix is less than or equal to 50% by weight.

4. The rubber composition according to claim 3, in which the weight fraction of said first diene elastomer in the elastomeric matrix ranges from 5% to 50% by weight.

5. The rubber composition according to claim 1, in which the weight fraction of said functionalized second diene elastomer in the elastomeric matrix is greater than or equal to 50% by weight.

6. The rubber composition according to claim 5, in which the weight fraction of said functionalized second diene elastomer in the elastomeric matrix ranges from 50% to 95% by weight.

7. The rubber composition according to claim 1, in which said first diene elastomer has a number-average molecular weight, Mn, ranging from 100 000 g/mol to 600 000 g/mol.

8. The rubber composition according to claim 1, in which said first diene elastomer is selected from the group consisting of polybutadienes, natural rubber, synthetic polyisoprenes, butadiene copolymers, isoprene copolymers and mixtures of these elastomers.

9. The rubber composition according to claim 1, in which said first diene elastomer is a copolymer of butadiene and styrene.

10. The rubber composition according to claim 1, in which said functionalized second diene elastomer is selected from the group consisting of polybutadienes, natural rubber, synthetic polyisoprenes, butadiene copolymers, isoprene copolymers and mixtures of these elastomers.

11. The rubber composition according to claim 1, in which said functionalized second diene elastomer is a copolymer of butadiene and styrene.

12. The rubber composition according to claim 1, in which in said functionalized second diene elastomer includes an SiOR function, R denoting a hydrogen atom or a hydrocarbon-based group, or a polysiloxane block having a silanol end.

13. The rubber composition according to claim 12, in which the polysiloxane block having a silanol end corresponds to the formula:

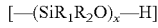

[—(SiR$_1$R$_2$O)$_x$—H]

wherein:

R$_1$ and R$_2$, which are identical or different, represent an alkyl, cycloalkyl, aryl, alkarylp or vinyl group having from 1 to 10 carbon atoms;

x is an integer ranging from 1 to 1500.

14. The rubber composition according to claim 1, in which the content of reinforcing inorganic filler ranges from 55 phr to 170 phr.

15. The rubber composition according to claim 14, in which the amount of reinforcing inorganic filler ranges from 20% to 30% by volume, relative to the volume of the rubber composition.

16. The rubber composition according to claim 1, in which the reinforcing inorganic filler is silica or a silica-covered carbon black.

17. The rubber composition according to claim 1, in which the reinforcing inorganic filler constitutes all of the reinforcing filler.

18. The finished or semi-finished article comprising a rubber composition according to claim 1.

19. The tire or semi-finished product comprising a rubber composition according to claim 1.

* * * * *